Patented May 6, 1924.

1,492,718

UNITED STATES PATENT OFFICE

FRANK E. LICHTENTHAELER, OF NEWTON HIGHLANDS, MASSACHUSETTS.

METHOD OF CONCENTRATING AQUEOUS SOLUTIONS OF VOLATILE SUBSTANCES.

No Drawing.   Application filed November 24, 1923. Serial No. 676,794.

*To all whom it may concern:*

Be it known that I, FRANK E. LICHTENTHAELER, a citizen of the United States, residing at Newton Highlands, in the county of Middlesex and State of Massachusetts, have invented certain new and useful Improvements in Methods of Concentrating Aqueous Solutions of Volatile Substances; and I do hereby declare the following to be a full, clear, and exact description of the invention, such as will enable others skilled in the art to which it appertains to make and use the same.

The present invention relates to an improved method of concentrating aqueous solutions of volatile substances.

In the application of Frank E. Lichtenthaeler Serial No. 581,245, filed August 11, 1922, is disclosed the generic method of concentrating volatile substances from aqueous solutions thereof by mixing with the dilution a quantity of anhydrous hydrate forming salt to combine with the water, allowing the hydrated salt to crystallize, and separating the volatile substance from the crystallized salt by passing a solvent of the volatile substance through the mass less in quantity than the amount of water removed by the hydrate forming salt. In addition to this genus, a species was claimed in such application in which the hydrate forming salt was ammonium alum. The broad invention contemplated not only the species wherein ammonium alum was used as the hydrate forming salt, but also one in which calcium chloride, iron sulphate, copper sulphate, sodium sulphate, aluminium sulphate, or the like, were used.

The present invention contemplates another species wherein sodium sulphate is used as the hydrate forming salt. The specific method herein described contemplates the concentration of aqueous solutions of acetic acid by the use of sodium sulphate.

Acetic acid in the form of vinegar is cheaply produced by the quick vinegar process from molasses. This vinegar ordinarily has a strength of 10% acetic acid. After preliminary cleansing by filtration or centrifuging, to the dilute acetic acid is added salt cake in the proportion of 100 pounds of the latter to 100 pounds of the 10% acetic acid. The salt cake is introduced in a pulverulent condition and is stirred in and thoroughly mixed with the dilute acetic acid after which it is allowed to cool. When the reaction is complete the mass consists of a body of hydrated sodium sulphate crystals associated with free highly concentrated acetic acid. The removal of the acid is effected in a battery of extraction cells operated in a continuous series manner, that is to say, an aqueous saturated solution of sodium sulphate is admitted to the first cell which is most nearly exhausted, and passes progressively to the other cells, the solution flowing out from each cell being progressively stronger in acetic acid than the next preceding cell, the solution finally issuing from the end cell of the series which is charged with fresh acid bearing crystallized hydrate. When the first cell is completely exhausted and withdrawn, at the same time a freshly charged cell is thrown in at the end of the series. The solvent first serves to remove traces of acid from the most nearly exhausted cell, and is then progressively concentrated by passage through the succeeding cells. The strong acid is displaced by the solvent and is forced ahead of the solvent so as to finally issue from a freshly charged cell in a highly concentrated condition. The saturated solution of sodium sulphate in water deposits its sodium sulphate as it takes up the acetic acid during its progress through the cells so that at the end of the process where the water is discharged from the last cell of the series, its sodium sulphate is small. The completely exhausted sodium sulphate free from acetic acid is dehydrated by heating for the purpose of driving off the water of crystallization. The crude concentrated acetic acid then requires simple evaporation to remove solids and coloring matter.

The use of salt cake is preferred because it may be heated to a temperature of 888° C. without decomposition. The removal of the water of crystallization may be carried on without danger of decomposition, whereas in case of ammonium alum great care would be required to be exercised in order to avoid decomposition and the consequent loss of dehydrated material.

Again salt cake or sodium sulphate is considerably cheaper, pound for pound, than ammonium alum, besides which it takes up 1.2 times its weight of water in forming the hydrate as compared with ammonium alum, which takes up only .9 of its weight of water.

Furthermore, the hydrate of sodium sulphate gives off its water at a low temperature, namely 33° C. and when it melts in its water of crystallization, the anhydride is precipitated in crystalline form. This results in a mass of compact anhydride crystals which may be readily dried and cooled ready for reuse. Ammonium alum hydrate, on the other hand, becomes an amorphous mass upon heating, which is difficult to completely dehydrate. It also requires special means for handling and crushing the light bulky anhydride which is amorphous instead of crystalline in form.

The recovery of the anhydrous sodium sulphate in crystalline form contributes to its desirability as a dehydrating agent because the solvent for the volatile substance such as the acetic acid passes freely through the mass of crystals. In the case of ammonium alum hydrate the crystals are very much finer, which greatly retards the flow of the solution through the mass. Because of this fact great care must be taken in dehydrating ammonium alum in order to insure the largest crystals possible, but even then the best results are much inferior to those easily obtained with sodium sulphate.

Finally, the sodium sulphate is available on the market in the shape of salt cake which is in an anhydrous form. This is not only a cheaper material than Glauber's salt, another form of sodium sulphate, but being anhydrous has the advantage of avoiding freightage on water of crystallization, which Glauber's salt contains to the extent of 50% or more.

All of these features of advantage of sodium sulphate over ammonium alum outweigh the one advantage which the latter has over sodium sulphate, namely hydrate sodium sulphate decomposes at about 33° C. It is therefore not available at room temperatures in excess of that, and during hot weather or in climates where the temperature exceeds that amount, some artificial refrigeration would be required in case sodium sulphate were used. But the expense incident to refrigeration would be more than offset by the lower price of sodium sulphate and the better adaptability of the qualities of the material to the working of the process.

Having thus described the invention, what is claimed is:

1. The method of concentrating aqueous dilutions of soluble volatile substances which consists in mixing therewith a quantity of anhydrous sodium sulphate to combine with the water, allowing the hydrated sodium sulphate to crystallize, and separating the volatile substance from the crystallized sodium sulphate by passing a solvent of the volatile substance through the mass less in quantity than the amount of water removed by the anhydrous sodium sulphate.

2. The method of concentrating aqueous dilutions of soluble volatile substances which consists in mixing therewith a quantity of anhydrous sodium sulphate to combine with the water, allowing the hydrated sodium sulphate to crystallize, and separating the volatile substance from the crystallized hydrated sodium sulphate by passing water through the mass less in quantity than the amount of water removed by the anhydrous sodium sulphate.

3. The method of concentrating dilute acetic acid which consists in mixing therewith a quantity of anhydrous sodium sulphate to combine with the water, allowing the hydrated sodium sulphate to crystallize, and separating the acetic acid from the sodium sulphate by passing a saturated aqueous solution of sodium sulphate through the mass.

4. The method of concentrating dilute acetic acid which consists in mixing therewith a quantity of anhydrous sodium sulphate 5% in excess of that required to combine with the water, allowing the hydrated sodium sulphate to crystallize, and separating the acetic acid from the sodium sulphate by passing water through the mass less in quantity than the amount of water removed by the anhydrous sodium sulphate.

5. The method of concentrating dilute acetic acid which consists in mixing therewith a quantity of anhydrous sodium sulphate 5% in excess of that required to combine with the water content of the acetic acid, allowing the mixture to stand a time for the hydrated sodium sulphate to crystallize, and separating the acetic acid from the hydrated sodium sulphate by passing a saturated aqueous solution of the latter through the mass.

6. The step in the method of concentrating dilute acetic acid which consists in subjecting the mass of hydrated crystallized sodium sulphate containing the acetic acid to the action of a saturated aqueous solution of the sodium sulphate in a battery of extraction cells operated in a continuous series manner to wash out and carry off the acetic acid.

FRANK E. LICHTENTHAELER.